July 31, 1951     A. P. KOVATCH ET AL     2,562,798
TIRE CHAIN AND ATTACHING STRUCTURE
Filed June 2, 1948
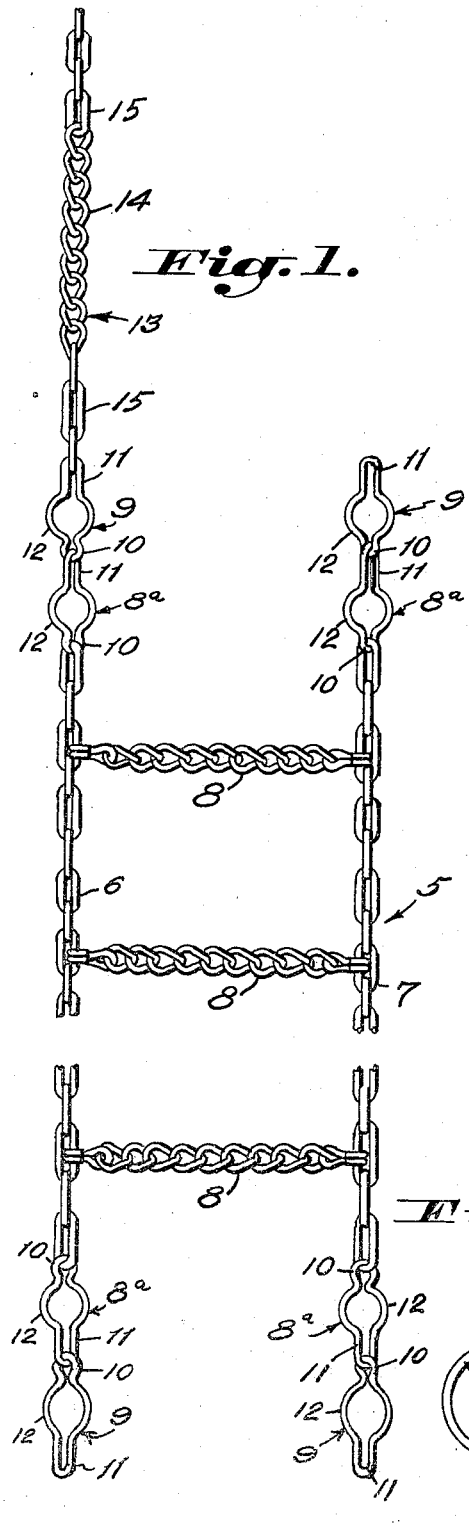
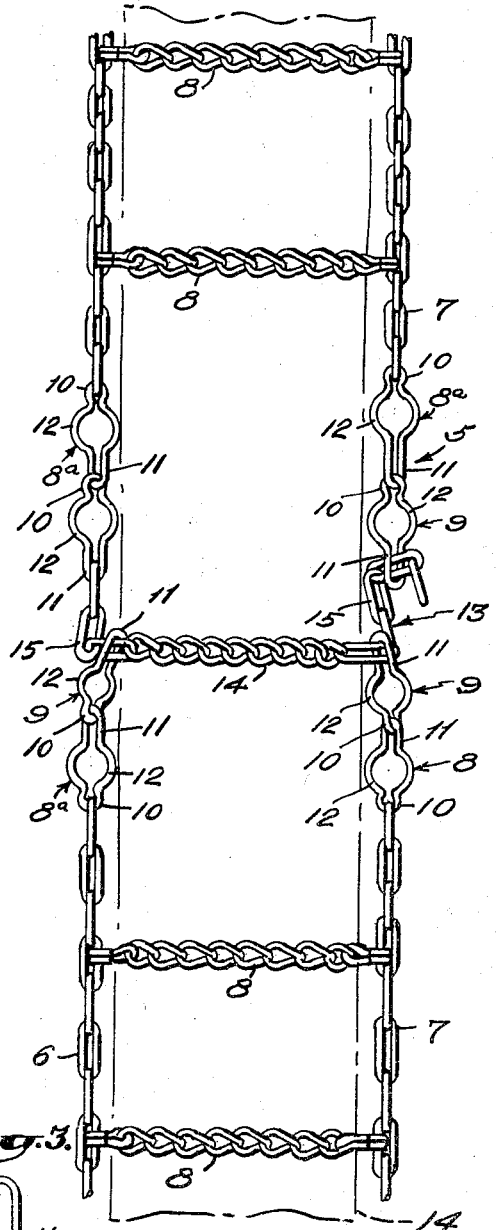
INVENTORS:
Anthony P. Kovatch
Walter Story
BY John K. Randolph
Attorney.

Patented July 31, 1951

2,562,798

UNITED STATES PATENT OFFICE 2,562,798

TIRE CHAIN AND ATTACHING STRUCTURE

Anthony P. Kovatch and Walter Story,
Cut Bank, Mont.

Application June 2, 1948, Serial No. 30,666

2 Claims. (Cl. 152—242)

This invention relates to an improved construction of tire chain of the "non-skid" type conventionally employed on pneumatic tires of motor vehicles for affording additional traction on slippery surfaces and more particularly has reference to a simplified means of attaching the chain around the tire or of detaching it therefrom without the use of clamps, buckles, hooks or other similar fastening means which are likely to become closed and clogged with ice under sub-freezing conditions.

Still a further object of the invention is to provide an improved tire chain which can be much more readily installed on or removed from wheels which are jacked up or in surface contact or under conditions where a wheel is mired down.

Still a further object of the invention is to provide an improved tire chain which can be more effectively tightened around a tire and which is especially adaptable for use on vehicles equipped with dual wheels to enable the chain to be readily fastened between the dual tires.

Still another object of the invention is to provide a tire chain of extremely simple construction which may be more economically manufactured and sold than conventional tire chains and which will be extremely efficient and durable for its intended purpose.

Various other objects and advantages of the invention will hereinafter become more fully apparent from the following description of the drawing, illustrating a presently preferred embodiment thereof, and wherein:

Figure 1 is a fragmentary plan view of the tire chain;

Figure 2 is a fragmentary plan view showing the ends thereof fastened around a tire, and Figure 3 is a plan view of one element of the chain.

Referring more specifically to the drawing, the improved tire chain in its entirety is designated generally 5 and includes corresponding side chains 6 and 7 connected in a conventional manner at longitudinally spaced points by conventional cross chains 8. The chains 6, 7 and 8 may be of any conventional construction or design.

The ends links of each of the chains 6 and 7 are preferably connected to an attaching link 8ᵃ and in the embodiment of the invention as illustrated a corresponding attaching link 9 is connected to each attaching link 8ᵃ although the links 9 may be omitted, if desired. Each of the links 8ᵃ and 9 includes a restricted eye portion 10 at one end thereof and an elongated restricted loop portion 11 at its opposite end the inner end of which opens into an enlarged intermediate portion 12 of the links 8ᵃ or 9 and which is preferably substantially circular. The eye portion 10 of the links 8ᵃ are connected to the end links of the chains 6 and 7 and the eye portions 10 of the links 9 engage the remote ends of the restricted loop portions 11 of said links 8ᵃ.

A chain 13 has one of its end links connected to the restricted loop portion 11 of one of the links 9 of the chain 6.

The chain 5 is applied around a pneumatic tire, partially shown at 14 in Figure 2 in a conventional manner and with the chain 6 disposed around the inner side wall of the tire 14. The chain 13 is then passed through the link 9 at the opposite end of the chain 6, said links 8ᵃ and 9 being of a size so that the links of the chain 13 can freely pass through the enlarged portions 12 thereof. The chain 13 is drawn up tight and one of the links thereof is then moved edgewise from the enlarged portion 12 of said last mentioned attaching link 9 into the restricted loop portion 11 thereof, the width of which will not permit passage of the links of the chains 13 therethrough when disposed crosswise of the slot of the loop portion 11 so that the chain 13 will thereby be anchored to the last mentioned attaching link 9. The chain 13 is then passed across the tread portion of the tire 14 and similarly engaged with the attaching link 9 at the corresponding end of the chain 7, as clearly illustrated in Figure 2, after which the chain 13 is extended back and similarly engaged with the attaching link 9 of the opposite end of the chain 7 complementary to the link 9, first referred to and to which the chain 13 is permanently fastened, as seen in Figure 1. It will thus be readily apparent that the portion 14 of the chain 13 will function as an additional cross chain and that the chain 5 may thereby be adjustably secured around the tire 14 without the use of buckles, clamps or hooks. The portion 14 of the chain 13 is formed of case hardened steel links like the links of the cross chains 8 and different from the conventional end links 15 of the chain 13 which engage the attaching links and which, like the side chain links, are of mild steel. The chain 13 also permits the side chains 6 and 7 to be properly tightened and enables connecting the ends of the chains 6 and 7 much more quickly and easily than where a conventional fastening means is employed. When the tire chain or tire is worn, in order that the links 14 will be disposed across the tire tread and the links 15 disposed to engage the attaching links, the chain 13 can be passed through the attaching links 8ª instead of the attaching links 9 and the latter left hanging with no interference, to thereby shorten the tire chain.

It will also be readily apparent that the attaching links 8ª and 9 will not become closed so that the chain 13 cannot be disengaged therefrom and that the attachment as previously described can much more readily be accomplished in conjunction with tires of dual wheels and where it is necessary to fasten the ends of a side chain between the dual wheels.

Various modifications and changes are contemplated and may obviously be resorted to, without departing from the spirit or scope of the invention as hereinafter defined by the appended claims.

We claim as our invention:

1. A tire chain attaching means comprising a plurality of attaching links, one of said attaching links being adapted to be connected to each of the end links of the two side chains of a tire chain, and an attaching chain attached to and forming an extension of one of said attaching links, each of the other attaching links having an enlarged intermediate portion through which the links of the attaching chain are freely slidable for detachably engaging the attaching chain with each of the last mentioned attaching links, and the last mentioned attaching links each having a restricted outer portion opening into said enlarged portion for receiving a link of the attaching chain edgewise therein, the opening of said restricted portion being of a width only slightly greater than the thickness of the links of the attaching chain for non-slidably connecting the attaching chain to each of the last mentioned attaching links.

2. A tire chain attaching means comprising an attaching chain forming an extension of one end of one of the two side chains of a tire chain, an attaching link connected to the other end of said side chain and to each end of the other side chain, each of said attaching links including an enlarged intermediate portion through which the attaching chain is freely passable for detachably engaging the attaching chain with each attaching link, and each attaching link having a restricted outer end portion opening into the enlarged intermediate portion for receiving a link of the attaching chain edgewise therein, said restricted portion being sized to snugly engage a link disposed edgewise therein for non-slidably connecting the attaching chain to each attaching link.

ANTHONY P. KOVATCH.
WALTER STORY.

REFERENCES CITED

The following references are of record in the file of this patent:

UNITED STATES PATENTS

| Number | Name | Date |
|---|---|---|
| 1,739,522 | Reyburn | Dec. 17, 1929 |
| 1,935,035 | Levi | Nov. 14, 1933 |
| 2,074,616 | Nartel | Mar. 23, 1937 |
| 2,130,293 | Bonforte | Sept. 13, 1938 |
| 2,500,373 | O'Connor | Mar. 14, 1950 |